3,201,494
HEXAFLUOROANTIMONIC ACID-CATALYZED HYDROCARBON CONVERSIONS

Jan M. Oelderik, Eduard L. Mackor, Joost C. Platteeuw, and Anton van der Wiel, all of Amsterdam, Netherlands, assignors to Shell Oil Company, New York, N.Y., a corporation of Delaware
No Drawing. Filed June 3, 1963, Ser. No. 284,806
Claims priority, application Great Britain, June 4, 1962, 21,498/62; Aug. 27, 1962, 32,851/62; Sept. 12, 1962, 34,854/62; Feb. 14, 1963, 6,087/63, 6,088/63
18 Claims. (Cl. 260—683.47)

This invention relates to a process for the catalytic conversion of hydrocarbons, and relates more particularly to a process for the catalytic conversion of lower molecular hydrocarbons, such as acylic and cyclic hydrocarbons with 2 to 12 carbon atoms in the molecule, or mixtures thereof.

Very well known catalysts for the conversion of hydrocarbons are those of the Friedel-Crafts type. In particular, much attention has been paid to the application of aluminum chloride, either as a solid or dissolved in molten antimony chloride as appears from the literature.

It has now been discovered that hexafluoroantimonic acid ($HSbF_6$), owing to a combination of favorable properties, is a preeminently suitable catalyst for the conversion of hydrocarbons. This catalyst, which is preferably used in its liquid form, has an exceptionally high activity as a result of which various hydrocarbon conversions may proceed considerably faster and/or at much lower temperatures than hitherto possible. Reactions that may suitably be carried out with the aid of the present catalyst are generally those that may take place under the influence of Friedel-Crafts catalysts, e.g., isomerization, alkylation, polymerization, and the like.

The $HSbF_6$ can be used as a catalyst as such or in diluted form. If the catalyst is employed in the liquid form preferably a diluent with a comparatively low density will be chosen, i.e., a density lower than that of the liquid hexafluoroantimonic acid catalyst. Liquid $HSbF_6$ has a relatively high specific gravity (2.8) and therefore when the process is carried out in mixers, a large expenditure of energy is required to establish intimate contact between the phases. In this case not more diluent is needed than is required to reduce the density to the desired level. The maximum amount of diluent is determined by the practical requirement that the phases be readily separable after intimate mixing of the hydrocarbon phase with the liquid catalyst.

The amount of diluent employed in any given instance can also be governed by the nature of the hydrocarbon conversion. Relatively high dilutions may be desirable for instance in reactions which proceed very violently or in those cases where one wishes to use a large ratio by volume between catalyst phase and hydrocarbon phase. As diluents preferable use is made of materials which are free or substantially free from water and which are substantially insoluble in the hydrocarbons to be converted. As examples of suitable diluents mention can be made of anhydrous or substantially anhydrous hydrofluoric acid (HF) and/or fluorinated hydrocarbons. Hydrofluoric acid is generally preferred because it has been found that with it the activity of the catalyst can in many cases be still further increased. As a rule the catalyst is diluted with no more than twenty parts by volume and usually with no more than ten parts by volume of diluent per part by volume of catalyst calculated as liquid $HSbF_6$. Generally less than 7 and more especially between 0.5 and 6 parts by volume of diluent per part by volume of catalyst are preferred. The catalyst may be employed over a wide temperature range; preference, however, is given to carrying out the hydrocarbon conversion at temperatures below 100° C. and particularly, depending upon the conversion concerned, at temperatures between −20 and 60° C. When the reaction is carried out in the liquid phase such a pressure is applied that undesirable evaporation of a hydrofluoric acid in the catalyst phase is prevented.

Hexafluoroantimonic acid is an extremely strong acid. At atmospheric pressure and room temperature it is a colorless liquid of specific gravity 2.8 which is practically insoluble in hydrocarbons. Hexafluoroantimonic acid can be prepared in a simple way by adding an equal molar quantity of hydrofluoric acid to antimony pentafluoride, which at room temperature is a colorless, viscous liquid. Upon mixing, the hydrofluoric acid reacts spontaneously with the antimony pentafluoride to form $HSbF_6$, a colorless liquid of low viscosity.

The preparation of hexafluoroantimonic acid can also take place by the action of an excess of hydrofluoric acid on antimony pentachloride. The replacement of chlorine by fluorine proceeds smoothly at temperatures between for instance 0 and 80° C. with formation of hydrochloric acid which escapes from the reaction mixture.

When this preparation is carried out on commercial scale the fluoroantimonic acid generally appears to contain some combined chlorine. Probably this is a result of the fact that the replacement of the last chlorine atom of the antimony pentachloride is comparatively difficult to effect. As a rule there is no objection to the use of such a chlorine-containing product as catalyst for the present conversions and this is possible in any case if the fluorine content of the product is at least 38 percent by weight. The activity of the chlorine-containing fluoroantimonic acid is lower than that of the hexafluoroantimonic acid in the pure form.

Th hexafluoroantimonic acid catalyst can be used in the form of the acid $HSbF_6$ and/or in the form in which the H of the acid is replaced by a hydrocarbon radical R to give $RSbF_6$. In many cases, especially when R represents a saturated cyclic hydrocarbon radical such as methylcyclopentane, cyclohexane, or methyl or ethyl cyclohexane, the R form of the catalyst has a higher initial activity than the H form. A further advantage of the $RSbF_6$-form is that it is considerably less corrosive than $HSbF_6$. A mixture of the two forms of the catalyst can also be used.

The preparation of the catalyst in the $RSbF_6$ form can take place by any synthesis known in organic chemistry. In a preferred method the reaction is carried out by contacting hexafluoroantimonic acid, for instance at room temperature, with a suitable hydrocarbon. Particularly suitable are saturated cyclic hydrocarbons (naphthenes), with 4 to 10 carbon atoms, such as methylcyclopentane, cyclohexane and/or methylcyclohexane. The preparation can also be performed in situ by carrying out the hydrocarbon conversion with a starting material that contains the required amount of naphthenes.

Both dilute and concentrated solutions of hexafluoroantimonic acid are very corrosive and attack a great number of commonly used materials of construction. Therefore, hydrocarbon conversions are preferably carried out in an apparatus that is constructed of or lined with corrosion-resistant material; generally suitable materials are those which are resistant to HF. By the term, "resistant to HF," should be understood here that under the conditions of the hydrocarbon conversion the material used loses less than 0.5 mm. per year and preferably less than 0.1 mm. per year in contact with the present catalyst. As examples of suitable metals mention can be made of platinum, aluminum, silver, nickel and lead; as examples of metal alloys; platinum-gold alloys, high nickel-molybdenum and/or nickel-tungsten alloys (Hastelloy-B and Hastelloy-C), and aluminum-magnesium alloys; as examples of synthetic substances: polyethene, polystyrene, polytrifluorochloroethene (Kel-F), polytetrafluoroethene (Teflon, Hostaflon, Fluon) and modified halide polymers (Tygon).

It is observed that attack of non-corrosion-proof materials, especially ferrous-metal-containing materials, results in the formation of fluorides, in consequence of which the hexafluoroantimonic acid catalyst is converted into antimony trifluoride which separates as a catalytically inactive white powder.

Several of the above-mentioned constructional materials were, in the presence of hexafluoroantimonic acid, diluted with anhydrous hydrofluoric acid, subjected to storage tests and to long-duration tests with thorough stirring under the conditions usually applied for the hydrocarbon conversions. It was found that for commercial application as constructional materials in particular Teflon, Hastelloy-B and Hastelloy-C are eligible. Teflon did not show any corrosion phenomena whatever, nor did any decline in catalyst activity occur. Hastelloy-B was attacked at a rate of less than 0.05 mm./yr. and only a slight decline in catalyst activity could be measured. Hastelloy-C showed corrosive attack at a rate of less than 0.01 mm./yr. with no measurable decline in catalyst activity.

Hydrocarbon conversions with hexafluoroantimonic acid catalysts can be operated continuously or discontinuously. If operated discontinuously, the hydrocarbons to be converted and the catalyst are introduced into a reactor provided with means to effect intimate contact between the catalyst and the hydrocarbons. This can be done in several ways, for instance, with the aid of a centrifugal mixer or a propeller mixer, if desired, combined with baffles. After a sufficiently long contact time the mixture is allowed to settle until the phases are separated from each other which occurs after a short time.

Preferably the present process is operated continuously. When a mixture of hydrocarbons is converted, for example, in case of alkylation reactions, the hydrocarbons can be introduced into the reactor separately or entirely or partly mixed with one another, at one or several points. The contact between catalyst and hydrocarbons can be brought about in the same manner as in the discontinuous embodiment of the process. In general the various means customarily employed in extraction processes to increase the contact area between two phases may also be used for the present purpose. Thus the process may be carried out in a column provided with perforated plates, projections or rotating discs.

The hydrocarbon phase and the catalyst phase may be passed through one or more reactors in concurrent, cross-current or in countercurrent flow with the hydrocarbons in the continuous or in the dispersed phase. Counter-current or cross-current flow, if desired combined with a temperature gradient, is preferred for obtaining optimum results. The reaction product together with the catalyst is passed continuously into a settling zone, where the hydrocarbons and the catalyst separate. The catalyst thus separated may be recycled and used as such or after bleeding and supplementing with fresh catalyst, for the conversion of another quantity of hydrocarbons.

In general, all reactions that take place in the presence of Friedel-Crafts catalysts can be suitably carried out with the aid of the present catalyst. The invention will be described with reference to isomerization and alkylation because generally these reactions proceed with considerably more difficulty and with lower product yields than other types of acid-catalyzed reactions. This description should not be construed to limit the scope of the invention, however.

As aliphatic starting materials for isomerization, the lower molecular unbranched and/or slightly branched paraffinic hydrocarbons with 5 to 7 carbon atoms in the molecule (e.g., n-pentane, n-hexane, the methylpentanes, n-heptane and the methylhexanes or mixtures thereof) are preferably chosen. As examples of commercial mixtures mention can be made of straight-run tops or light naphtha fractions which in various refineries are available in large amounts.

To obtain optimum results with commercial starting materials, it is usually recommendable to submit these mixtures to a pretreatment for removal of harmful constituents. As undesirable constituents in paraffin isomerization mention may be made of unsaturated compounds, (especially alkadienes) and of benzene, water and sulphur compounds. Most of these constituents, e.g., alkadienes, water and sulphur compounds may be removed by a treatment of the starting material with a spent hexafluoroantimonic acid catalyst.

As stated above, the present catalyst possesses an exceptionally high activity. This is particularly advantageous in the isomerization of paraffinic hydrocarbons, because it enables the reaction to be carried out in practice at comparatively low temperatures, where the equilibrium is particularly favorable. The temperature at which these isomerizations are carried out is as a rule in the range of from −10 to 60° C. and preferably between 10 and 50° C.

Surprisingly it appeared that the reaction rate obtained with the hexafluoroantimonic acid catalyst can be increased considerably by effecting the isomerization in the presence of isobutane. Remarkably, it was found that isobutane is not or substantially not converted in the reaction; under the conditions applied it is found unchanged in the reaction mixture. The effect is obviously specific for isobutane, since n-butane appears to exert no influence at all in this respect. Preferably from 5 to 25 percent by weight of isobutane is employed, calculated on the feed.

Although the hexafluoroantimonic acid catalyst possesses a high selectivity, it appears that during, e.g., isomerization, disproportionation may occur in some measure. By disproportionation is understood here the formation of cracked products of lower, and polymeric compounds with higher molecular weight than the feed. As these polymers which are unsaturated in character, tend to deactivate the catalyst, with a view to a long catalyst life it is desirable that disproportionation should be suppressed as far as possible.

Hydrogen has proved to be very suitable for this purpose. Hydrogen may be introduced in the reactor as a gas or predissolved in the feed. In the latter case the quantity desired can be adjusted by control of the hydrogen partial pressure. It is observed that the disproportionation in general increases according as the reaction temperature is higher and/or the chain length of the hydrocarbons is longer. Although the disproportionation can be suppressed to a greater extent as more hydrogen is used, preference is given to hydrogen concentrations which are not too high, because otherwise there is a risk of the hexafluoroantimonic acid catalyst being reduced to catalytically inactive antimony trifluoride. Desirable hydrogen concentration can easily be determined by increasing the pressure until a substantial amount of antimony trifluoride starts to form as a precipitate. As a rule 0.5–3% mol hydrogen per mole of feed is used.

The hydrogen used in the process may be wholly or partly recovered from the reaction products and be recycled.

In those cases where disproportionation has occurred the hydrogen to be recycled may contain small amounts of lower molecular weight hydrocarbons, e.g., methane and ethane. In order to prevent a build-up of these contaminants part of the hydrogen to be recycled is bled and replaced by fresh hydrogen.

Surprisingly it has also been found that the catalyst life can be increased substantially by carrying out the isomerization of paraffinic hydrocarbons with the catalyst in the $RSbF_6$ form and in the presence of a certain amount of naphthenes in excess of the amount of hydrocarbons bound to the catalyst. In a continuous performance of the process this can be effected, for example, by continuously adding to the feed such an amount of naphthenes, that the reaction medium preferably contains from 5 to 50 percent by weight of naphthenes, e.g., methylcyclopentane, cyclohexane, methylcyclohexane and/or ethylcyclohexane. After working up of the isomerizate the naphthenes recovered by, e.g., distillation, can be recirculated. In the case where as starting material use is made of a hydrocarbon fraction which already contains naphthenes, supplementing with methylcyclopentane and the like to the desired concentration may suffice.

As alicyclic starting materials for isomerization mention may be made of saturated cyclic hydrocarbons (naphthenes), for example methylcyclopentane. This latter compound is of commercial importance, because upon isomerization it yields cyclohexane, which—as such or after dehydrogenation to benzene—is an important base material for the chemical industry.

Likewise the dimethylcyclopentanes can be isomerized to methycyclohexane which can subsequently be dehydrogenated to toluene. With the aid of the present catalyst toluene can be further converted into a mixture of benzene and xylenes, which are more valuable than toluene.

An interesting starting material for isomerization is ethylcyclohexane, which upon isomerization with the aid of the present hexafluoroantimonic acid catalyst yields a product which after dehydrogenation contains approximately 90 percent $C_8$ aromatics. These aromatics consist of approximately 86% of m- and p-xylene, 12% of o-xylene, and only 2% of ethylbenzene. The remaining 10% of the dehydrogenation product is formed by benzene, toluene and naphthenes. As the $C_8$ aromatic mixture thus obtained contains only a small amount of ethylbenzene, it is a valuable source for the industry for the manufacture of chemicals based on xylenes.

It is observed that ethylcyclohexane is available in large amounts in the petroleum industry, e.g., in the form of naphthenic straight-run fractions. Ethylcyclohexane may also be obtained by hydrogenation of, e.g., $C_8$ platformate fractions which usually contain appreciable amounts of ethylbenzene. The subsequent isomerization of the ethylcyclohexane contained in the straight-run fraction and in the hydrogenated platformate fraction may be performed without any further pretreatment of these fractions. The isomerization of naphthenes generally proceeds under the same conditions as described hereinbefore for the isomerization of paraffinic hydrocarbons; the reaction rate is as a rule much higher.

As aromatic starting materials for isomerization in principle all isomerizable polyalkylaromatic hydrocarbons may be used; mention can be made of the xylenes. It is observed that the range of the reaction temperatures used generally lies on a somewhat higher level than that of paraffin isomerization, suitable temperatures being in the range of 25 to 100° C.

The present conversions can be carried out countercurrently in several stages, and, if desired, with a temperature gradient. For example, the isomerization of aliphatic hydrocarbons can very suitably be performed in three reactors arranged in series. In this procedure the fresh feed in the first reactor comes into contact with partly spent catalyst. The partly isomerized hydrocarbons subsequently come into contact with more active catalyst in the second reactor and with still more active catalyst in the third reactor where fresh catalyst is introduced. In this last reactor a relatively low temperature, for instance 25° C., may be maintained, so as to take the maximum advantage of the favorable isomerization equilibrium at this temperature. In the second reactor the temperature then is, about 30° C., while in the first reactor the activity of the largely spent catalyst can be raised by applying a temperature of about 40° C.

It is observed that in the several reactors preferably relatively high catalyst/hydrocarbon ratios, e.g., between 1–3 volumes of catalyst per volume of hydrocarbon, are maintained. The activity and the amount of catalyst in each reactor can easily be kept on the required level by adding only a small amount of fresh catalyst to the system. In the above-mentioned three stage countercurrent procedure this may be accomplished by continuously feeding fresh catalyst into the third reactor and bleeding a corresponding amount of spent catalyst from the first reactor. The high catalyst/hydrocarbon ratio in the reactors may be maintained by passing the hydrocarbon-catalyst dispersion after each reactor in a settling zone and recycling the greater part of the catalyst separated therein. The spent catalyst finally discharged can still be used for the removal of certain contaminants, such as alkadienes, water and sulphur compounds, from the hydrocarbons to be converted.

As regards alkylations, the alkylation of alkanes with alkenes can be mentioned. The extraordinary properties of the present hexafluoroantimonic acid catalyst appear clearly from the alkylation of isobutane with ethene, a reaction which proceeds with a high rate even at temperatures well below 0° C., whereas with the conventional HF catalyst no or practically no alkylation occurs even at much higher temperatures.

The exceptional activity of the present hexafluoroantimonic acid catalyst appears very clearly from comparative experiments which have been carried out at 40° C. with a number of other catalysts of the Friedel-Crafts type.

As hydrocarbon starting material, n-hexane with a methylcyclopentane content of 3 percent by weight was chosen. A comparative investigation has been made into the reaction rates with respect to the hexane isomerization for a hexafluoroantimonic acid catalyst consisting of 6 g. $HSbF_6$ diluted with 10 g. liquid HF on the one hand, and the systems listed below on the other hand, with application of similar amounts of catalysts:

(1) Aluminum chloride-liquid hydrochloric acid
(2) Antimony trichloride-liquid hydrochloric acid
(3) Antimony pentachloride-liquid hydrochloric acid
(4) Borontrifluoride-liquid hydrofluoric acid
(5) Titanium tetrafluoride-liquid hydrofluoric acid
(6) Niobium pentafluoride-liquid hydrofluoric acid
(7) Tantalum pentafluoride-liquid hydrofluoric acid It was found that with the aluminum chloride-liquid hydrochloric acid system isomerization occurred. However, it took three hours to reach 95% of the n-hexane equilibrium conversion, which with the hexafluoroantimonic acid catalyst was reached within 20 minutes. Moreover, an important technological disadvantage is, that the liquid hydrochloric acid phase at 25° C. already exerts a pressure of 50 atmospheres.

Antimony trichloride as such and dissolved in liquid hydrochloric acid is completely inactive. With antimony pentachloride-liquid hydrochloric acid chlorination of the hydrocarbon occurs and no isomerization was observed. Boron trifluoride-liquid hydrofluoric acid (tetrafluoroboric acid dissolved in hydrofluoric acid), which from the literature is known as an isomerization catalyst, gave a reaction rate at 60° C. which was only $\frac{1}{500}$ of that obtained with the hexafluoroantimonic acid catalyst at 40° C. The reaction rates obtained with titanium tetrafluoride, niobium pentafluoride and tantalum pentafluoride dissolved in liquid hydrofluoric acid, were found to be considerably lower than those of the hexafluoroantimonic acid catalyst.

Finally, an experiment was carried out with hydrofluoric acid as such. In a Hastelloy-B 100-ml. reactor, provided with a vibrating stirrer, 50 ml. methylcyclopentane was contacted at 25° C. with 30 ml. hydrofluoric acid. After 30 minutes no isomerization had occurred.

The following examples are included to illustrate but not to limit the utility of this remarkable catalyst.

EXAMPLE I 50 ml. n-hexane was isomerized at a hydrogen pressure of 9.5 atmospheres absolute by stirring it in a Hastelloy-B reactor with a solution of 3.0 ml. hexafluoroantimonic acid ($HSbF_6$) in hydrofluoric acid obtained by dissolving 7.8 g. antimony pentafluoride in 11 g. hydrofluoric acid. The reaction temperature was 25° C. The results are tabulated in Table I.

Table I

| Reaction time in minutes | 30 | 45 | 60 | 75 | 90 | 240 |
|---|---|---|---|---|---|---|
| Fraction <$C_6$-hydrocarbons (% w. based on reaction product) | 1.1 | 1.4 | 1.5 | 1.8 | 1.8 | 2.4 |
| Compositions $C_6$-hydrocarbons in percent w.: | | | | | | |
| 2,2-dimethylbutane | 9.8 | 17.2 | 24.1 | 29.7 | 35.1 | 53.2 |
| 2,3-dimethylbutane | 10.6 | 12.9 | 13.5 | 13.4 | 12.7 | 9.5 |
| 2-methylpentane | 24.4 | 29.8 | 31.4 | 30.6 | 29.3 | 22.0 |
| 3-methylpentane | 11.4 | 13.9 | 14.6 | 14.3 | 13.6 | 10.2 |
| n-Hexane | 43.8 | 26.2 | 16.4 | 12.0 | 9.3 | 5.1 |

EXAMPLE II 50 ml. n-hexane was isomerized under the same conditions as mentioned in Example I with the exception that now a technical, chlorine-containing, hexafluoroantimonic acid catalyst was used. The catalyst which contained 40% w. fluorine was prepared by reacting antimony pentachloride with hydrofluoric acid and removing the hydrochloric acid formed.

It appeared that the same isomerization results were obtained as shown in Table I; the reaction time required, however, was about doubled.

EXAMPLE III

In a Hastelloy-B 100-ml. reactor, provided with a vibrating stirrer, 50 ml. n-hexane was isomerized in the presence of hydrogen with a catalyst consisting of 3.8 ml. hexafluoroantimonic acid diluted with 13 ml. hydrofluoric acid. The reaction temperature was 25° C., the hydrogen pressure 1 atmosphere absolute.

From chromatographic analyses it appeared that the time required for reaching 95% of the maximum obtainable conversion of n-hexane was 48 minutes.

Under the same conditions n-hexane was isomerized with a hexafluoroantimonic acid catalyst in the $RSbF_6$ form. The catalyst was prepared by stirring 3.8 ml. hexafluoroantimonic acid, diluted with 13 ml. hydrofluoric acid, with 20 ml. methylcyclopentane and separating the $C_6H_{11}SbF_6$/HF catalyst phase from the excess hydrocarbon phase.

With this pretreated catalyst 95% of the maximum obtainable conversion of n-hexane was reached in 30 minutes.

EXAMPLE IV

In a 30 ml. reactor, lined with Kel-F (polymeric monochlorotrifluoroethylene) and provided with a vibrating stirrer, 25 ml. n-hexane, containing 3% w. methylcyclopentane, was isomerized with an undiluted hexafluoroantimonic acid catalyst in the $RSbF_6$ form. The catalyst was prepared by stirring 2 ml. $HSbF_6$ with 10 ml. methylcyclopentane and separating the excess hydrocarbon phase from the $C_6H_{11}SbF_6$-catalyst. The reaction temperature was 25° C.

After 20 minutes 65% of the n-hexane had been isomerized. The composition of the reaction mixture is tabulated in Table II.

Table II

| | Percent w. |
|---|---|
| 2,2-dimethylbutane | 17.7 |
| 2,3-dimethylbutane | 10.3 |
| 2-methylpentane | 24.9 |
| 3-methylpentane | 11.5 |
| n-Hexane | 35.6 |

EXAMPLE V

In order to demonstrate the beneficial influence of diluting the hexafluoroantimonic acid catalyst with hydrofluoric acid, experiments were carried out with n-hexane under the same conditions as described in Example IV with the exception that now the catalyst was diluted with hydrofluoric acid.

With HF/$C_6H_{11}SbF_6$ volume ratios of 2.1, 3.3 and 4.5 95% of the equilibrium conversion of n-hexane was reached after 32 min., 30 min. and 28 min., respectively.

EXAMPLE VI

In a stirred 100-ml. reactor lined with polytetrafluoroethene (Teflon) 50 ml. n-pentane was isomerized in the presence of hydrogen with a catalyst consisting of 1.5 ml. hexafluoroantimonic acid diluted with 20 ml. hydrofluoric acid. The reaction temperature was 25° C., the hydrogen pressure 1 atmosphere absolute.

From chromatographic analyses it appeared that the time required for reaching 95% of the n-pentane-isopentane equilibrium was 88 minutes.

Under the same conditions n-pentane was isomerized with a hexafluoroantimonic acid catalyst in the $RSbF_6$ form. The catalyst was previously prepared by stirring 1.5 ml. hexafluoroantimonic acid, diluted with 20 ml. hydrofluoric acid, with 20 ml. methylcyclopentane and separating the $C_6H_{11}SbF_6$/HF catalyst phase from the excess hydrocarbon phase.

With this pretreated catalyst 95% of the equilibrium n-pentane-isopentane was reached in 27 minutes.

EXAMPLE VII

In the reactor as used in Example VI, 50 ml. n-hexane containing 3% w. methylcyclopentane was isomerized under the same conditions and with the same amount of $RSbF_6$ catalyst as described in Example VI, with and without the addition of isobutane.

From the results in Table III A it appears that isobutane has a beneficial influence on catalyst activity whereas n-butane does not seem to have any influence at all.

Under the same conditions and with the same catalyst n-pentane containing 3% w. methylcyclopentane was isomerized with and without the addition of isobutane. From the results in Table III B it is obvious that isobutane also accelerates the isomerization of n-pentane to a substantial degree.

Table III

A. ISOMERIZATION OF n-HEXANE (+3% W. METHYLCYCLOPENTANE)

| | | | | | |
|---|---|---|---|---|---|
| (1) | Percent w. isobutane added | 0 | 5.7 | 9.2 | 15.4 |
| | Time required for reaching 95% of equilibrium n-hexane conversion (min.) | 54 | 40 | 33 | 33 |
| (2) | Percent w. n-butane added | 0 | 9.8 | 14.9 | |
| | Time required for reaching 95% of equilibrium n-hexane conversion (min.) | 47 | 47 | 47 | |

B. ISOMERIZATION OF n-PENTANE (+3% W. METHYLCYCLOPENTANE)

| | | | | |
|---|---|---|---|---|
| Percent W. isobutane added | 0 | 13.1 | | |
| Time required for reaching 95% of equilibrium n-pentane conversion (min.) | 27 | 18 | | |

EXAMPLE VIII

In the same stirred reactor as used in Example III, 70 ml. of a mixture composed of 77.2% w. n-heptane and 22.8% w. isobutane, was isomerized at 20° C. and a hydrogen pressure of 18.5 atmospheres absolute. The catalyst was prepared at 20° C. by stirring 2.9 ml. hexafluoroantimonic acid—diluted with 25 ml. hydrofluoric acid—with 15 ml. methylcyclopentane and separating the excess hydrocarbon phase.

After 2 hours the composition of the heptane fraction in the reaction mixture was as tabulated in Table IV. From this composition it appears that 95.5% w. of the heptanes in this fraction consists of branched isomers with a considerable amount in the double-branched form.

Table IV

|  | Percent w. |
|---|---|
| 2,2-dimethylpentane | 16.7 |
| 2,4-dimethylpentane+2,2,3-trimethylbutane | 22.0 |
| 3,3-dimethylpentane | 12.1 |
| 2,3-dimethylpentane+2-methylhexane | 28.3 |
| 3-methylhexane | 15.3 |
| Ethylpentane | 1.1 |
| n-Heptane | 4.5 |

When heptane is isomerized in the absence of isobutane it appears that some disproportionation occurs.

EXAMPLE IX

In a continuously operated Teflon reactor of the mixer-settler type a commercial $C_5$–$C_6$ straight-run fraction containing 3.6% w. of naphthenes was isomerized at 25° C. with the aid of a hexafluoroantimonic acid catalyst which had been pretreated with methylcyclopentane. The weight hourly space velocity was 7.2 g. feed per g. $HSbF_6$. Before being introduced into the reactor the $C_5$–$C_6$ fraction was debenzenized by percolating it through silica gel and subsequently saturated with hydrogen at a pressure of 21 atmospheres absolute (approx. 2% mol. hydrogen).

Under the same conditions experiments were carried out with the $C_5$–$C_6$ fraction after addition of an amount of naphthenes up to a concentration of 10% w. and 20% w., respectively. The naphthenes which were added consisted of a mixture of methylcyclopentane and cyclohexane in a weight ratio of 1:8.5.

From the results tabulated in Table V it appears that the n-$C_5$ content in the reaction mixture, being the amount of unconverted pentane, remains more nearly constant at a higher naphthene content in the feed, indicating that catalyst stability benefits from the increased naphthene content.

Table V

| Feed | | Percent w. n-$C_5$ in $C_5$–$C_6$ fraction after — | | | | | | |
|---|---|---|---|---|---|---|---|---|
| Percent w. naphthenes | Percent w. n-$C_5$ | 20 hrs. | 40 hrs. | 60 hrs. | 80 hrs. | 100 hrs. | 120 hrs. | 140 hrs. |
| 3.6 | 62.1 | 23.8 | 24.3 | 26.3 | 28.9 | 31.9 | 39.9 | 46.0 |
| 10 | 62.1 | 22.7 | 22.6 | 22.4 | 25.1 | 29.5 | 31.6 | 31.9 |
| 20 | 62.1 | 22.8 | 23.5 | 24.7 | 25.5 | 25.6 | 26.3 | 27.0 |

EXAMPLE X

In the same reactor of the mixer-settler type as used in Example IX a commercial $C_5$–$C_6$ straight-run fraction containing 2.2% w. naphthenes was continuously isomerized at 25° C. with the aid of a hexafluoroantimonic acid catalyst which had been pretreated with methylcyclopentane. The weight hourly space velocity was 7.2 g. feed per g. $HSbF_6$ per hour. Before being introduced into the reactor the $C_5$–$C_6$ fraction was debenzenized by percolating it through silica gel and subsequently saturated with hydrogen at 16 atmospheres absolute.

Under the same conditions experiments were carried out with the $C_5$–$C_6$ fraction, but now saturated with hydrogen at a pressure of 26 and 21 atmospheres absolute, respectively.

From the results tabulated in Table VI and especially from the rate of increase in n-$C_5$ and n-$C_6$-paraffins content in the isomerizate it appears that the catalyst activity decline rate was lowest in the case where the feed was saturated with hydrogen at a pressure of 21 atmosphere absolute. At the end of this experiment the color of the catalyst was bright yellow. At the end of the experiment with a hydrogen saturation at 26 atmospheres absolute the color of the catalyst was nearly black, while part of the catalyst had been reduced to $SbF_3$ in the form of a white powder on the bottom of the reactor.

Table VI

| Feed saturated with hydrogen at— | | Composition of feed in percent w. | Composition of reaction product in percent w. after— | | | | |
|---|---|---|---|---|---|---|---|
| | | | 10 hrs. | 30 hrs. | 50 hrs. | 70 hrs. | 90 hrs. |
| 16 atm. abs. | $C_5$-fraction: | | | | | | |
| | Isopentane | 36.7 | 79.8 | 77.6 | 74.6 | 70.5 | 58.2 |
| | n-Pentane | 63.3 | 20.2 | 22.4 | 25.4 | 29.5 | 41.8 |
| | $C_6$-fraction: | | | | | | |
| | 2,2-dimethylbutane | 0.9 | 37.0 | 32.3 | 26.7 | 22.0 | 9.9 |
| | 2,3-dimethylbutane | 3.8 | 10.9 | 11.1 | 12.0 | 12.7 | 12.8 |
| | 2-methylpentane | 25.4 | 26.1 | 27.7 | 29.2 | 29.5 | 29.4 |
| | 3-methylpentane | 20.2 | 11.6 | 12.5 | 12.9 | 13.3 | 13.6 |
| | n-Hexane | 49.6 | 14.4 | 16.4 | 19.2 | 22.5 | 34.4 |
| 26 atm. abs. | $C_5$-fraction: | | | | | | |
| | Isopentane | 36.7 | 79.8 | 74.8 | 66.4 | | |
| | n-Pentane | 63.3 | 20.2 | 25.2 | 33.6 | | |
| | $C_6$-fraction: | | | | | | |
| | 2,2-dimethylbutane | 0.9 | 38.0 | 27.5 | 16.5 | | |
| | 2,3-dimethylbutane | 3.8 | 11.4 | 12.6 | 13.5 | | |
| | 2-methylpentane | 25.4 | 26.9 | 29.0 | 30.2 | | |
| | 3-methylpentane | 20.2 | 12.0 | 13.5 | 14.0 | | |
| | n-Hexane | 49.6 | 11.8 | 17.4 | 25.8 | | |
| 21 atm. abs. | $C_5$ fraction: | | | | | | |
| | Isopentane | 36.7 | 77.4 | 77.2 | 75.6 | 73.8 | 71.9 |
| | n-Pentane | 63.3 | 22.6 | 22.8 | 24.4 | 26.2 | 28.1 |
| | $C_6$-fraction: | | | | | | |
| | 2,2-dimethylbutane | 0.9 | 35.2 | 34.4 | 30.9 | 28.3 | 24.4 |
| | 2,3-dimethylbutane | 3.8 | 12.0 | 11.6 | 11.8 | 12.0 | 12.6 |
| | 2-methylpentane | 25.4 | 25.7 | 26.9 | 27.6 | 28.3 | 29.0 |
| | 3-methylpentane | 20.2 | 11.4 | 12.5 | 12.8 | 13.1 | 13.5 |
| | n-Hexane | 49.6 | 15.7 | 14.6 | 16.6 | 18.3 | 20.5 |

EXAMPLE XI

In a Hastelloy-B 100 ml. reactor, provided with a vibrating stirrer, 50 ml. methylcyclopentane was isomerized at 25° C. with a catalyst consisting of 8 ml. $HSbF_6$ diluted with 30 ml. HF. After 5 minutes the cyclo-$C_6H_{12}$ fraction was composed of 11.5% w. methylcyclopentane and 88.5% w. cyclohexane. As the equilibrium mixture contains 10.8% w. methylcyclopentane it appears that the isomerization proceeds very rapidly.

EXAMPLE XII

In the same stirred reactor as used in Example XI 38.4 g. ethylcyclohexane, prepared by hydrogenating ethylbenzene, was isomerized at 25° C. with 8.45 g. of a hexafluoroantimonic acid catalyst diluted with 19.3 g. hydrofluoric acid which had been pretreated with methylcyclopentane and ethylcyclohexane.

After a contact time of 5 minutes the isomerizate was separated from the catalyst phase and divided into two parts A and B, which were dehydrogenated over a platinum-on-silica catalyst at 400° C. and 440° C. respectively.

With the same catalyst and under the same conditions, with the exception of the contact time, which now was 2 hours, ethylcyclohexane was isomerized. After separation of the catalyst phase the isomerizate was divided into two parts C and D, which were dehydrogenated over the same platinum catalyst at 400° C. and 420° C., respectively.

The composition of the dehydrogenated isomerizates and the composition of $C_8$-aromatics is tabulated in Table VII.

EXAMPLE XIII

In the same stirred reactor as used in Example XI a mixture of 25 ml. n-hexane and 25 ml. methylcyclopentane was isomerized at 40° C. with a catalyst consisting of 8 ml. $HSbF_6$ diluted with 30 ml. HF.

After one hour it appeared that methylcyclopentane as well as n-hexane had reached the thermodynamic isomerization equilibrium. The composition of the $C_6H_{14}$ components is tabulated in Table VII.

Table VIII

Composition of the $C_6$-paraffins: Percent w.
- 2,2-dimethylbutane _____ 51
- 2,3-dimethylbutane _____ 9.4
- 2-methylpentane _____ 23.0
- 3-methylpentane _____ 11.1
- n-hexane _____ 5.4

Composition of the $C_6$-naphthenes:
- Methylcyclopentane _____ 14.5
- Cyclohexane _____ 85.5

EXAMPLE XIV

In the same stirred reactor as used in Example XI 52 ml. of a mixture of m-xylene and toluene in a mol ratio 1:1 was isomerized at 66° C. with a catalyst consisting of 1.7 ml. hexafluoroantimonic acid diluted with 10 ml. hydrofluoric acid.

After 60 min. the xylene fraction of the reaction product contained 14.2% w. p-xylene, 73.8% w. m-xylene and 12% w. o-xylene.

The thermodynamic equilibrium at 66° C. in the liquid phase contains 59% w. m-xylene. Hence the m-xylene conversion observed amounted to 100−73.8/100−59 =63% of the equilibrium conversion.

EXAMPLE XV

In the same stirred reactor as used in Example XI 50 ml. straight-run tops (<72° C.) was isomerized at 35° C. with a hexafluoroantimonic acid catalyst which had been pretreated with methylcyclopentane. The catalyst was prepared by stirring 2.7 ml. hexafluoroantimonic acid— diluted with 16 ml. hydrofluoric acid—with 30 ml. methylcyclopentane and separating the $C_6H_{11}SbF_6$/HF catalyst phase from the excess hydrocarbon phase.

The straight-run tops which had been debenzenized by percolating through silica gel, had a composition as tabulated in Table IX.

*Table IX.—Composition of the straight-run tops*

|  | Percent w. |
|---|---|
| Butanes | 3.00 |
| Iso-pentane | 15.34 |
| n-Pentane | 26.47 |
| 2,2-dimethylbutane | 0.48 |
| 2,3-dimethylbutane | 1.93 |
| 2-methylpentane | 13.02 |
| 3-methylpentane | 10.37 |
| n-Hexane | 25.42 |
| Cyclopentane | 1.73 |
| Methylcyclopentane | 2.24 |
| Benzene, <10 p.p.m. | |

*Table VII*

| Composition of the dehydrogenated isomerizates | Isomerizate A dehydrogenated at 400° C. | Isomerizate B dehydrogenated at 440° C. | Isomerizate C dehydrogenated at 400° C. | Isomerizate D dehydrogenated at 420° C. |
|---|---|---|---|---|
| Benzene | 1.8 | 1.4 | 1.4 | 1.2 |
| $C_7$-naphthenes | 0.7 |  | 0.4 | 0.4 |
| $C_8$-naphthenes | 8.0 |  | 7.8 | 1.5 |
| Toluene | 3.1 | 7.3 | 3.5 | 6.4 |
| Ethylbenzene | 1.9 | 2.1 | 2.0 | 1.6 |
| m- and p-Xylene | 74.7 | 78.9 | 73.1 | 77.9 |
| o-Xylene | 9.7 | 10.3 | 11.8 | 10.9 |
| Composition of the $C_8$-aromatics of the dehydrogenated isomerizates: |  |  |  |  |
| Ethylbenzene | 2.2 | 2.3 | 2.3 | 1.8 |
| m- and p-Xylene | 86.6 | 86.4 | 84.1 | 86.2 |
| o-Xylene | 11.2 | 11.3 | 13.6 | 12.1 |

The composition of the $C_5$- and the $C_6$-fractions in the feed and in the reaction product after 1, 2, 3 and 4 minutes, respectively was as tabulated in Table X.

*Table X*

|  | Feed | Reaction product after— | | | |
|---|---|---|---|---|---|
|  |  | 1 min. | 2 min. | 3 min. | 4 min. |
| Isopentane | 36.69 | 52.2 | 61.8 | 67.7 | 72.7 |
| n-Pentane | 63.31 | 47.8 | 38.2 | 32.3 | 27.3 |
| 2,2-dimethylbutane | 0.94 | 9.2 | 14.7 | 18.0 | 24.3 |
| 2,3-dimethylbutane | 3.77 | 10.8 | 10.8 | 12.2 | 11.8 |
| 2-methylpentane | 25.42 | 28.5 | 29.7 | 30.6 | 30.0 |
| 3-methylpentane | 20.24 | 14.5 | 15.1 | 15.1 | 14.5 |
| n-Hexane | 49.63 | 37.0 | 29.7 | 24.1 | 19.4 |

EXAMPLE XVI

A commercial light straight-run tops fraction with a final boiling point below 72° C. was isomerized by passing it continuously through three identical stirred Hastelloy-C tankreactors, in cross-current with a hexafluoroantimonic acid catalyst at a temperature of 40° C. The catalyst had been prepared by stirring 2.5 ml. $HSbF_6$ in 20 ml. HF with 30 ml. methylcyclopentane and separating the catalyst phase from the excess hydrocarbon phase. Before being introduced into the reactor system the tops fraction was debenzenized by percolating it through silica gel. Then a mixture of methylcyclopentane and cyclohexane was added to the feed in such an amount that the total amount of naphthenes was 20% w. Finally the mixture was saturated with hydrogen at a pressure of 20 atmospheres absolute and continuously passed through the reactors at a weight hourly space velocity of 1.8 kg. per kg. catalyst (calculated on $HSbF_6$) per hour. In order to keep the catalyst activity on a constant level 0.03 g. hexafluoroantimonic acid per kg. feed per hour was introduced into each of the reactors, amounting to 0.09 g. fresh catalyst per kg. feed. The continuous stream of hydrocarbon catalyst dispersion leaving the reactors was passed into a settler and the separated catalyst-phase was continuously recycled to the reactors after removal of a slip stream of equilibrium catalyst corresponding to the amount of fresh catalyst introduced.

The compositions of the feed and of the effluent after the first, the second and the third reactor (without the added naphthenes) are tabulated in Table XI.

As the final reaction product had an F-1-3 octane number of 97.6, as against an F-1-3 octane number of 87.3 for the feed, it appears that a valuable premium gasoline component was obtained.

*Table XI*

|  | Composition of feed in percent w. (without added naphthenes) | Composition of reaction product in percent w. (without added naphthenes) after— | | |
|---|---|---|---|---|
|  |  | 1st reactor | 2d reactor | 3d reactor |
| n-Pentane | 25.4 | 16.4 | 11.9 | 9.6 |
| Isopentane | 15.5 | 24.5 | 28.9 | 31.3 |
| 2,2-dimethylbutane | 1.4 | 7.0 | 11.8 | 15.2 |
| 2,3-dimethylbutane | 1.6 | 6.2 | 6.4 | 6.4 |
| 2-methylpentane | 11.8 | 14.9 | 15.4 | 15.3 |
| 3-methylpentane | 10.0 | 6.9 | 7.2 | 7.1 |
| n-Hexane | 27.5 | 17.4 | 11.6 | 8.3 |
| Butanes and $C_5+C_6$ naphthenes | 6.8 | 6.8 | 6.8 | 6.8 |
| F-1-3 octane number | 87.3 | 92.8 | 95.8 | 97.6 |

EXAMPLE XVII

The same straight-run tops fraction as used in Example XVI was isomerized by passing it continuously through three identical stirred Hastelloy-C tankreactors in countercurrent with a pretreated hexafluoroantimonic acid catalyst diluted with 15 vol. hydrofluoric acid per vol. of catalyst. Before being introduced into the reactor system the tops fraction was debenzimized, then naphthenes were added to the feed which was finally saturated with hydrogen as described in Example XVI. Fresh catalyst was introduced into the third reactor, which was kept at 25° C.; the temperatures of the second and first reactors being 30° C. and 40° C., respectively. The total weight hourly space velocity over the whole reactor system amounted to 1.8 kg. feed per kg. hexafluoroantimonic acid per hour with an addition of fresh catalyst of 1.1 g. $HSbF_6$ per kg. feed per hour. After each reactor the hydrocarbon-catalyst dispersion was passed into a settler from which the catalyst phase was recycled to the same reactor except for a slip stream which was passed into the next reactor.

The compositions of the feed and of the reaction product after the third reactor are tabulated in Table VIII. The F-1-3 octane numbers of the feed and the reaction product were 87.3 and 101.7, respectively, the reaction product being a highly valuable blending component for premium gasolines.

*Table XII*

|  | Composition of feed in percent w. (without added naphthenes) | Composition of reaction product in percent w. (without added naphthenes) |
|---|---|---|
| Butanes | 1.2 | 1.3 |
| Isopentane | 15.5 | 34.5 |
| n-Pentane | 25.4 | 6.4 |
| 2,2-dimethylbutane | 1.4 | 25.2 |
| 2,3-dimethylbutane | 1.6 | 5.3 |
| 2-methylpentane | 11.8 | 12.7 |
| 3-methylpentane | 10.0 | 5.8 |
| n-Hexane | 27.5 | 3.3 |
| $C_5+C_6$ naphthenes | 5.6 | 5.5 |
| F-1-3 octane number | 87.3 | 101.7 |

EXAMPLE XVIII

The straight-run tops fraction as used in Example XVI was isomerized in the same reactor system and under the same conditions as described in this example, with the exception that the temperature in the three reactors was now kept at 25° C.

The composition of the feed and of the reaction product after the third reactor are tabulated in Table XII. The product having a F-1-3 octane number of 99.9 is a valuable premium gasoline component.

*Table XIII*

|  | Composition of feed in percent w. (without added naphthenes) | Composition of reaction product in percent w. (without added naphthenes) |
|---|---|---|
| Butanes | 1.2 | 1.4 |
| Isopentane | 15.5 | 34.3 |
| n-Pentane | 25.4 | 6.6 |
| 2,2-dimethylbutane | 1.4 | 22.3 |
| 2,3-dimethylbutane | 1.6 | 5.7 |
| 2-methylpentane | 11.8 | 13.7 |
| 3-methylpentane | 10.0 | 6.4 |
| n-Hexane | 27.5 | 4.1 |
| $C_5+C_6$ naphthenes | 5.6 | 5.5 |
| F-1-3 octane number | 87.3 | 99.9 |

EXAMPLE XIX

In a 100-ml. Hastelloy-B reactor, provided with a vibrating stirrer, 36 g. isobutane was alkylated with 3.5 g. ethene with the aid of 1.2 ml. hexafluoroantimonic acid diluted with 7 ml. hydrofluoric acid. In a period of 2 hours the 3.5 g. ethene was continuously introduced into the reactor. The reaction was effected at a temperature of 0° C. and a hydrogen pressure of 5 atmospheres absolute.

Apart from unreacted isobutane, the reaction product consisted of 6 g. of a pentane fraction and 6.8 g. of a hexane fraction, small amounts of $C_2$- and $C_3$-hydrocarbons and heavier products.

From the results it appears that with the hexafluoroantimonic acid catalyst the difficult alkylation of an isoparaffin with ethene can be effected.

EXAMPLE XX

In a continuously operated stirred reactor isobutane (1.81 mole/h.) was alkylated with ethene (0.38 mole/h.) with the aid of 1.7 ml. $HSbF_6$ diluted with hydrofluoric acid by dissolving 4.5 g. antimony pentafluoride in 70 g. liquid hydrofluoric acid. Before being introduced into the reactor isobutane and ethene were mixed with one another at elevated pressure. The reaction was effected at a temperature of −10° C. and a hydrogen pressure of 10 atm. abs. The reaction products were, together with the catalyst, continuously passed into a settler, where the catalyst rapidly separted, after which it was recycled to the reactor.

The results of the experiments are tabulated in Tables XIV and XV.

*Table XIV*

| Composition of reaction product (after removal of unconverted isobutane), in percent w. | Time, minutes | | | | |
|---|---|---|---|---|---|
|  | 110–140 | 140–170 | 170–200 | 200–230 | 230–260 |
| $<C_6$-hydrocarbons | 31.4 | 41.4 | 51.4 | 48.2 | 46.8 |
| $C_6$-hydrocarbons | 60.4 | 50.2 | 44.0 | 42.9 | 43.7 |
| $>C_6$-hydrocarbons | 8.2 | 8.4 | 4.6 | 8.9 | 9.5 |

*Table XV*

| Composition $C_6$-hydrocarbons in percent w. | Time, minutes | | | | |
|---|---|---|---|---|---|
|  | 110–140 | 140–170 | 170–200 | 200–230 | 230–260 |
| 2,2-dimethylbutane | 4.7 | 4.7 | 3.0 | 3.5 | 1.9 |
| 2,3-dimethylbutane | 70.7 | 69.2 | 72.1 | 71.5 | 68.7 |
| 2-methylpentane | 2.7 | 17.0 | 16.8 | 16.0 | 17.3 |
| 3-methylpentane | 1.8 | 9.1 | 8.1 | 9.0 | 12.1 |
| n-Hexane |  |  |  |  |  |

EXAMPLE XXI

In a stirred one-litre Hastelloy-B reactor 500 ml. toluene was converted at a temperature of 95° C. with the aid of 30 ml. hexafluoroantimonic acid catalyst diluted with 300 ml. hydrofluoric acid.

The composition of the reaction product after 7 hours was as tabulated in Table XVI.

Table XVI

|  | Percent w. |
|---|---|
| Cracked products <80° C. | 0.3 |
| Benzene | 18.9 |
| Toluene | 61.1 |
| Ethylbenzene | 0.4 |
| Xylenes | 13.0 |
| Tri+tetramethylbenzenes | 6.3 |

We claim as our invention:

1. A process for the catalytic conversion of hydrocarbons with from 2 to 12 carbon atoms per molecule and mixtures thereof to other hydrocarbons which comprises contacting the hydrocarbons substantially in the liquid phase with a hexafluoroantimonic acid catalyst, the acid catalyst contacting materials of construction which are resistant to corrosion by said catalyst.

2. A process according to claim 1 wherein the hexafluoroantimonic acid catalyst is selected from the group consisting of $HSbF_6$ and $RSbF_6$ where R is a saturated cyclic hydrocarbon radical.

3. A process according to claim 2 wherein R is a saturated cyclic hydrocarbon radical of 4 to 10 carbon atoms per molecule.

4. A process according to claim 1 wherein the hexafluoroantimonic acid catalyst is diluted with a diluent selected from the group consisting of fluorinated hydrocarbons and hydrofluoric acid.

5. A process for the catalystic conversion of hydrocarbons with from 2 to 12 carbon atoms per molecule and mixtures thereof to other hydrocarbons which comprises contacting the hydrocarbons substantially in the liquid phase at temperatures below 100° C. with a hexafluoroantimonic acid catalyst of chemical formula $RSbF_6$ where R is a saturated cyclic hydrocarbon radical of 4 to 10 carbon atoms per molecule.

6. A process for the catalytic conversion of hydrocarbons with from 2 to 12 carbon atoms per molecule and mixtures thereof to other hydrocarbons which comprises contacting the hydrocarbon feed substantially in the liquid phase with a hexafluoroantimonic acid catalyst in the presence of 0.5–3% mol hydrogen per mol of feed at temperatures below 100° C.

7. A process according to claim 6 wherein the catalyst is diluted with not more than 20 parts by volume of a diluent selected from the group consisting of fluorinated hydrocarbons and hydrofluoric acid per part by volume of catalyst.

8. A process for the catalytic isomerization of hydrocarbons with 5 to 7 carbon atoms per molecule and mixtures thereof which comprises contacting the hydrocarbons with a hexafluoroantimonic acid catalyst in the presence of from 5 to 25% by weight, basis feed, of isobutane, at temperatures below 100° C.

9. A process for the catalytic conversion of hydrocarbons with from 2 to 12 carbon atoms per molecule to other hydrocarbons which comprises contacting the hydrocarbons at temperatures below 100° C. substantially in the liquid phase in a corrosion-resistant medium with a hexafluoroantimonic acid catalyst diluted with not more than 20 parts by volume of hydrofluoric acid per part by volume of catalyst.

10. A process for the catalytic alkylation of hydrocarbons with from 2 to 12 carbon atoms per molecule and mixtures thereof which comprises contacting the hydrocarbons substantially in the liquid phase at temperatures below 100° C. with a hexafluoroantimonic acid catalyst which is diluted with not more than 20 parts by volume HF per part by volume catalyst the acid catalyst contacting materials of construction which are resistant to corrosion by said catalyst.

11. A process for the catalytic conversion of hydrocarbons with from 2 to 12 carbon atoms per molecule and mixtures thereof to other hydrocarbons which comprises contacting the hydrocarbons substantially in the liquid phase with a hexafluoroantimonic acid catalyst diluted with not more than 7 parts by volume hydrofluoric acid per part by volume catalyst.

12. The process according to claim 11 wherein the hydrocarbon conversion is isomerization and the hydrocarbons have from 5 to 7 carbon atoms per molecule.

13. The process according to claim 11 wherein the conversion is carried out at a temperature below 100° C.

14. A process for the catalytic conversion of hydrocarbons with from 2 to 12 carbon atoms per molecule and mixtures thereof to other hydrocarbons which comprises contacting the hydrocarbons substantially in the liquid phase with a hexafluoroantimonic acid catalyst diluted with from .5 to 6 parts by volume hydrofluoric acid per part by volume catalyst.

15. The process according to claim 14 wherein the hydrocarbon conversion is isomerization and the hydrocarbons have from 5 to 7 carbon atoms per molecule.

16. The process according to claim 14 wherein the conversion is carried out at a temperature below 100° C.

17. A process for catalytic conversion of hydrocarbons having from 2 to 12 carbon atoms per molecule and mixtures thereof to other hydrocarbons which comprises contacting the hydrocarbons with a catalyst having the formula $RSbF_6$ were R is selected from the group consisting of hydrogen and saturated cyclic hydrocarbon radicals having 4 to 10 carbon atoms, said conversion being effected in an environment of materials of construction which corrode at a rate less than 0.5 mm. per year.

18. A process for catalytic conversion of hydrocarbons having from 2 to 12 carbon atoms per molecule and mixtures thereof to other hydrocarbons which comprises contacting the hydrocarbons with a catalyst having the formula $RSbF_6$ were R is selected from the group consisting of hydrogen and saturated cyclic hydrocarbon radicals having 4 to 10 carbon atoms, said conversion being effected in an environment of non-ferrous materials of construction.

References Cited by the Examiner

UNITED STATES PATENTS

| 2,431,715 | 12/47 | Wachter | 260—683.51 |
| 2,862,036 | 11/58 | Baranauckas et al. | 260—653.6 X |
| 3,003,003 | 10/61 | McGinty | 260—653.6 |
| 3,079,448 | 2/63 | Jenny | 260—683.47 X |

OTHER REFERENCES

Hudlicky, M., Chemistry of Organic Fluorine Compounds, Macmillan, New York, 1962, p. 59.

ALPHONSO D. SULLIVAN, *Primary Examiner.*